United States Patent
Kienreich

(10) Patent No.: US 11,401,955 B2
(45) Date of Patent: Aug. 2, 2022

(54) PISTON-CYLINDER UNIT

(71) Applicant: VAT Holding AG, Haag (CH)

(72) Inventor: Martin Kienreich, Horbranz (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 16/965,665

(22) PCT Filed: Jan. 10, 2019

(86) PCT No.: PCT/EP2019/050519
§ 371 (c)(1),
(2) Date: Jul. 29, 2020

(87) PCT Pub. No.: WO2019/154579
PCT Pub. Date: Aug. 15, 2019

(65) Prior Publication Data
US 2021/0040964 A1 Feb. 11, 2021

(30) Foreign Application Priority Data

Feb. 9, 2018 (AT) .................................. A 33/2018

(51) Int. Cl.
| F15B 15/14 | (2006.01) |
| F16K 31/122 | (2006.01) |
| F16K 41/10 | (2006.01) |
| F16K 51/02 | (2006.01) |

(52) U.S. Cl.
CPC ...... *F15B 15/1461* (2013.01); *F16K 31/1221* (2013.01); *F16K 41/10* (2013.01); *F16K 51/02* (2013.01)

(58) Field of Classification Search
CPC .... F16K 51/02; F16K 31/122; F16K 31/1221; F15B 15/1433; F15B 15/1461
See application file for complete search history.

(56) References Cited

U.S. PATENT DOCUMENTS

| 2,775,024 A | 12/1956 | Seal |
| 3,286,737 A | 11/1966 | Kelly, Jr. |
| 3,335,998 A | 8/1967 | Heinz |
| 3,604,463 A | 9/1971 | McLarty |
| 3,617,026 A | 11/1971 | Polyakov et al. |
| 3,695,149 A | 10/1972 | Eberhart |
| 3,703,125 A | 11/1972 | Pauliukonis |
| 4,211,151 A | 7/1980 | Wallischeck |

(Continued)

FOREIGN PATENT DOCUMENTS

| CN | 101349295 | 1/2009 |
| CN | 201339715 | 11/2009 |

(Continued)

*Primary Examiner* — Abiy Teka
*Assistant Examiner* — Michael Quandt
(74) *Attorney, Agent, or Firm* — Volpe Koenig

(57) ABSTRACT

A piston-cylinder unit having a cylinder housing (1) with a cylinder interior (2) and a piston (3) arranged in cylinder interior (2), from which a piston rod (4) starts and is guided out from the cylinder housing (1) through an opening and at the same time is sealed with respect to the cylinder housing (1) by a piston rod seal (12) arranged on the cylinder housing (1). A sliding sleeve (11) made of plastic and entrained by the piston rod (4) is arranged on the piston rod (4), and the piston rod seal (12) bears against said sliding sleeve.

8 Claims, 3 Drawing Sheets

(56) References Cited

U.S. PATENT DOCUMENTS

| | | | |
|---|---|---|---|
| 4,995,589 A | 2/1991 | Adishian et al. | |
| 5,755,261 A | 5/1998 | Fukuzawa et al. | |
| 6,612,538 B2 | 9/2003 | Fukano et al. | |
| 6,691,607 B2 | 2/2004 | Vatterott et al. | |
| 6,837,484 B2 * | 1/2005 | Kingsford | F16K 41/103 |
| | | | 251/324 |
| 7,644,647 B2 * | 1/2010 | Reul | F15B 15/204 |
| | | | 92/79 |
| 8,196,893 B2 | 6/2012 | Grout et al. | |
| 8,714,523 B2 * | 5/2014 | Lee | F16K 41/10 |
| | | | 251/335.3 |
| 8,726,935 B2 * | 5/2014 | Leys | B01F 15/0429 |
| | | | 137/606 |
| 8,991,299 B2 * | 3/2015 | Gage | F15B 15/1428 |
| | | | 92/170.1 |
| 2001/0052586 A1 | 12/2001 | Tamura et al. | |
| 2002/0056819 A1 | 5/2002 | Contin et al. | |
| 2008/0006114 A1 | 1/2008 | Reul et al. | |
| 2012/0126159 A1 | 5/2012 | Lee | |
| 2012/0132437 A1 | 5/2012 | Gong et al. | |
| 2013/0008306 A1 | 1/2013 | Gage et al. | |
| 2013/0313458 A1 | 11/2013 | Kouketsu et al. | |

FOREIGN PATENT DOCUMENTS

| | | |
|---|---|---|
| CN | 103536076 | 1/2014 |
| CN | 106855124 | 6/2017 |
| DE | 2820449 | 12/1978 |
| DE | 3635694 | 5/1988 |
| DE | 4203620 | 1/1993 |
| DE | 10130956 | 2/2005 |
| DE | 102007032488 | 2/2008 |
| DE | 112009000858 | 5/2011 |
| DE | 102011086823 | 6/2012 |
| EP | 0081043 | 6/1983 |
| EP | 1462210 | 9/2004 |
| EP | 1873425 | 1/2008 |
| FR | 1286908 | 1/1961 |
| GB | 1574610 | 9/1980 |
| WO | 03042548 | 5/2003 |
| WO | 2017155404 | 9/2017 |

* cited by examiner

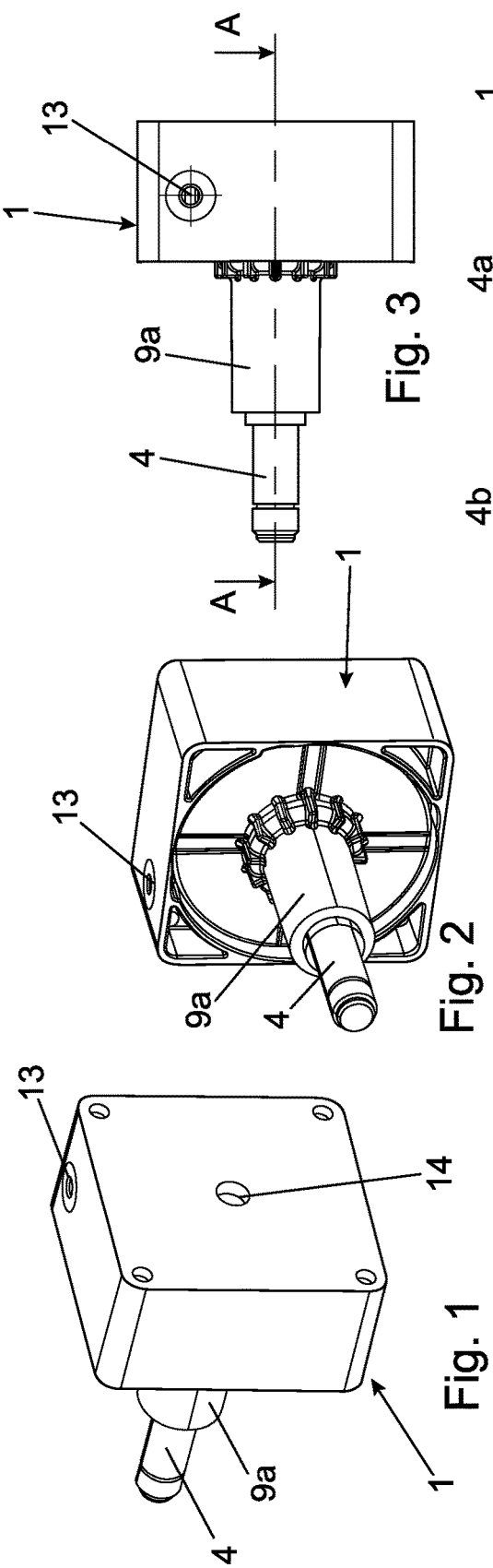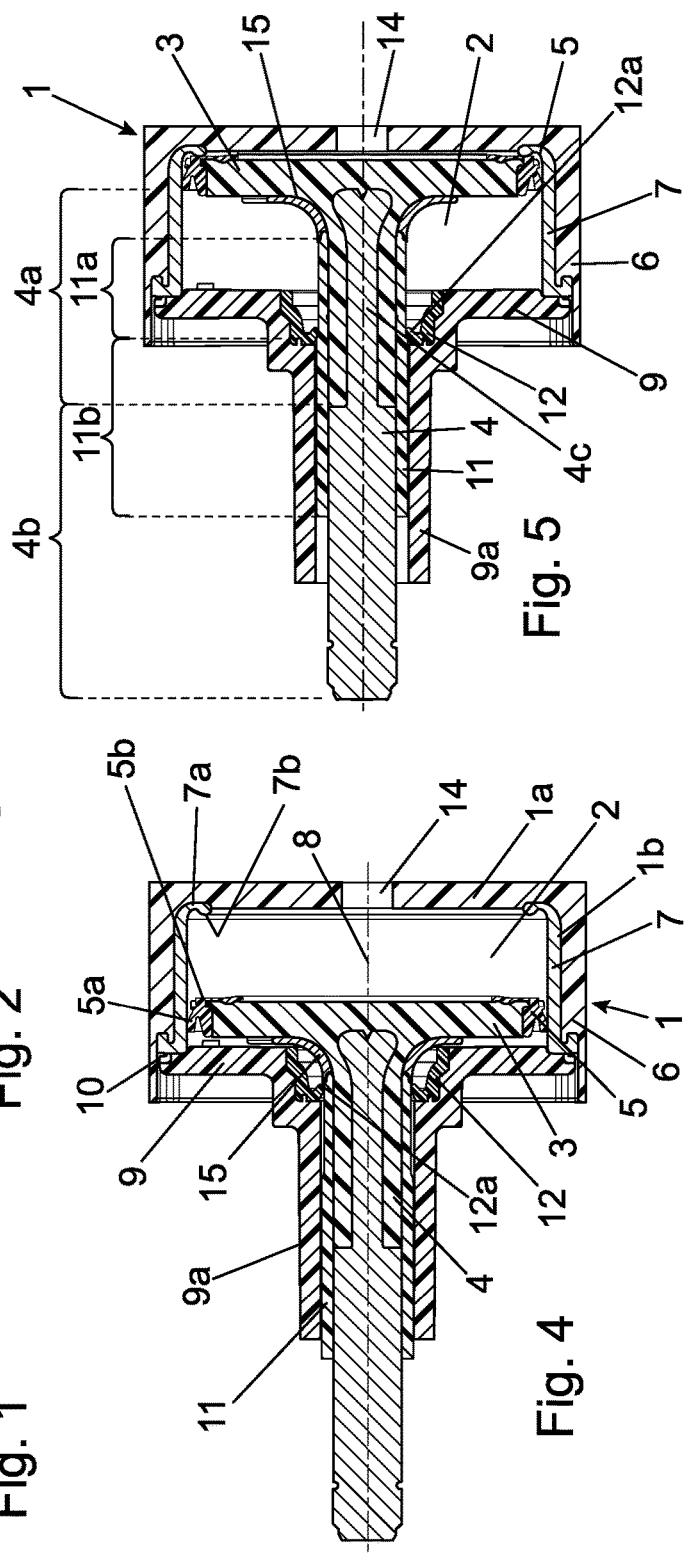

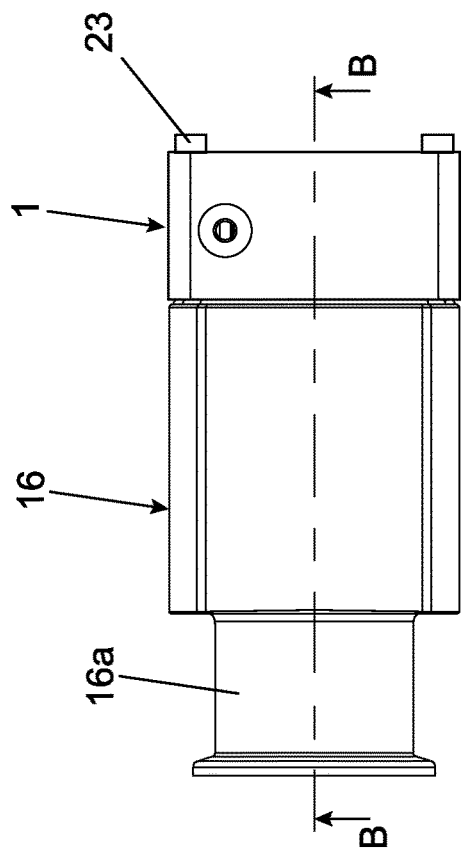
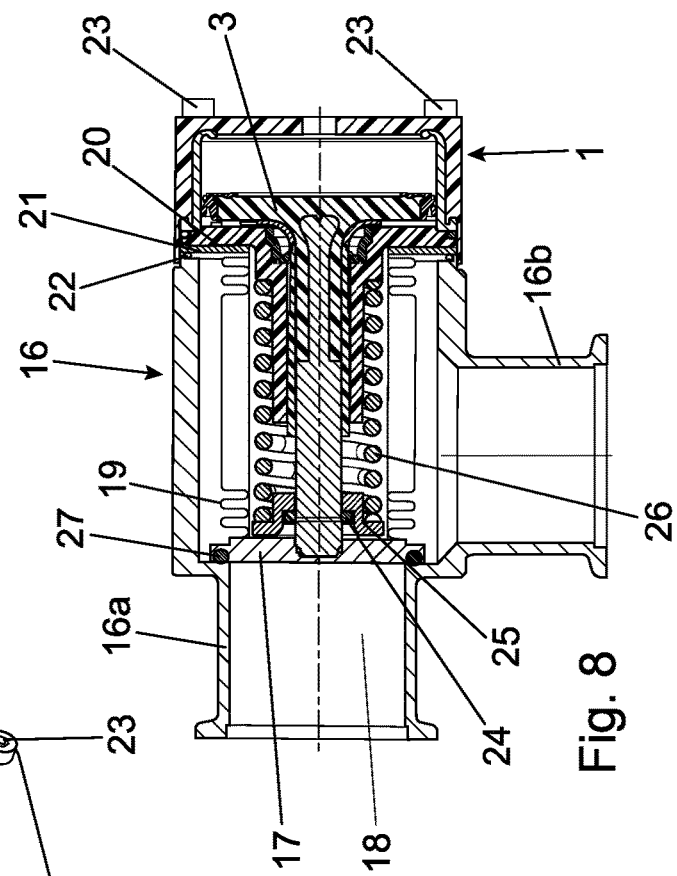
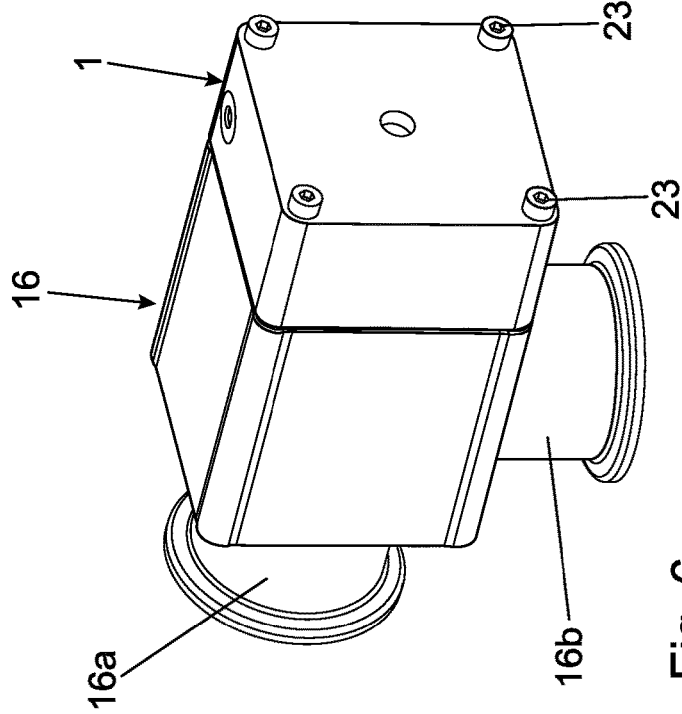

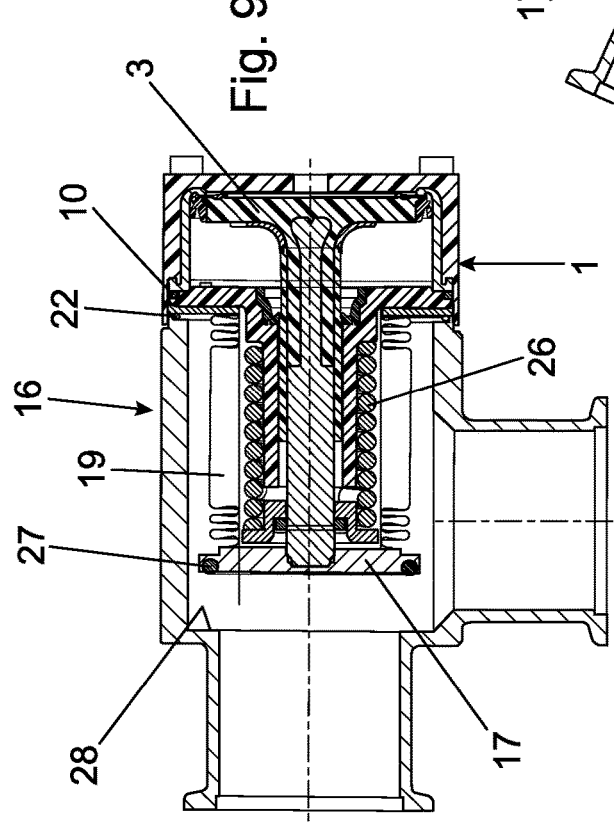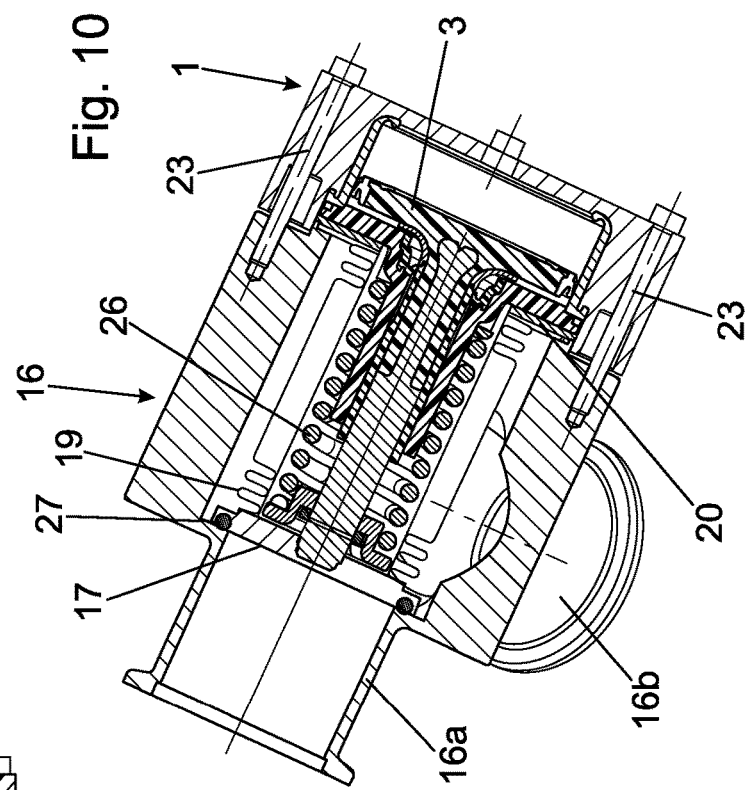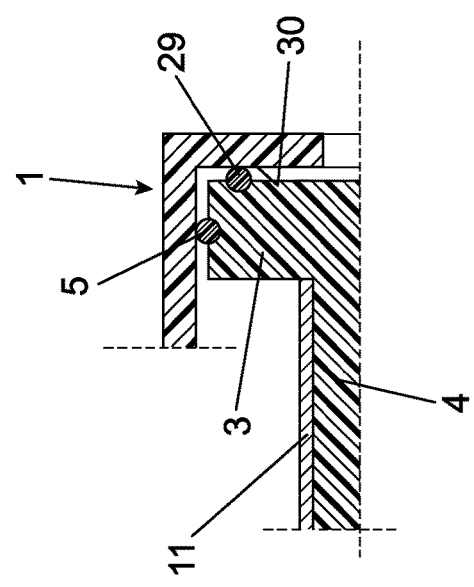

PISTON-CYLINDER UNIT

TECHNICAL FIELD

The invention relates to a piston-cylinder unit with a cylinder housing which has a cylinder interior space, and with a piston which is arranged in the cylinder interior space and from which a piston rod emanates which is guided through an opening out of the cylinder housing and is sealed here with respect to the cylinder housing by a piston rod seal which is arranged on the cylinder housing.

BACKGROUND

Pneumatic piston-cylinder units which are configured from plastic and serve as drives, for example for vacuum valves, are known. Lubrication with grease or oil is usually required for continuous operation. It is a disadvantage here that the discharge of the lubricant can repeatedly occur in practice, which can be a problem precisely in sensitive surroundings, such as under clean room conditions. The quantity of lubricant to be introduced is always critical and applying it precisely is not simple and is associated with high costs.

Piston-cylinder units which operate without lubricant are also already known, for example from U.S. Pat. Nos. 3,703,125 and 3,286,737. For this purpose, materials which comprise at least one solid lubricant are used in the region of the cylinder wall. Thus, in U.S. Pat. No. 3,286,737, the cylinder shell is provided with an inner layer which comprises solid lubricants which can be formed by molybdenum disulfide, graphite, tungsten disulfide, tellurium disulfide, selenium disulfide, titanium disulfide or mixtures thereof.

SUMMARY

It is an object of the invention to provide an advantageous piston-cylinder unit of the type mentioned at the outset which is distinguished, in particular, by a small release of particles into the surroundings of the piston-cylinder unit, which is advantageous, in particular, under clean room conditions. According to the invention, this is achieved by way of a piston-cylinder unit with one or more features described herein.

In the case of the (in particular, pneumatic) piston-cylinder unit according to the invention, a sliding sleeve which is made from plastic, is moved together with the piston rod, against which the piston rod seal bears, and by which a sealing action of the piston rod with respect to the cylinder housing takes place, is arranged on the piston rod. A considerable reduction of the production of particles in the case of the displacement of the piston rod is achieved by way of the arrangement of the sliding sleeve on the piston rod. The sliding sleeve can also advantageously serve for the axially displaceable guidance of the piston rod with respect to the cylinder housing. To this end, the sliding sleeve can have a guide section, in the region of which a sliding guide is configured between the sliding sleeve and the cylinder housing. It is particularly advantageous if the sliding sleeve has a seal section, in the region of which the piston rod seal bears against the sliding sleeve, and has the guide section in a different region of the longitudinal extent of the sliding sleeve, that is to say the seal section and the guide section do not overlap in relation to the axial direction of the piston rod. The guide function and the seal function can be separated from one another as a result.

The sliding sleeve can advantageously comprise a solid lubricant. This can be, for example, molybdenum disulfide, graphite, ceramic particles (such as glass beads), very finely dispersed soft metals (for example, aluminum, copper, lead) or plastics, such as PTFE, or a combination thereof.

For the axial guidance of the sliding sleeve, the cylinder housing can advantageously have a tubular stub-shaped section which forms the opening, through which the piston rod is guided out of the cylinder space, the tubular stub-shaped section guiding the sliding sleeve in an axially displaceable manner, that is to say forming a radial bearing for the sliding sleeve. In particular, the tubular stub-shaped section can project to the outside from a cover of the cylinder housing.

In one advantageous embodiment of the invention, the cylinder housing has a base body and a sliding bush which is made from plastic, is arranged within the base body, and against which a piston seal which is arranged on the piston bears for sealing purposes between the piston and the cylinder housing. As a result, the static requirements of the cylinder housing and the requirements with regard to the contact area with the piston seal can be separated from one another. The sliding bush can advantageously comprise a solid lubricant. This can be, for example, molybdenum disulfide, graphite, ceramic particles (such as glass beads), very finely dispersed soft metals (for example, aluminum, copper, lead) or plastics, such as PTFE, or a combination thereof.

One possible embodiment of the invention provides that, in a withdrawn end position of the piston, a section of the piston seal or a further seal which is arranged on the piston bears against a sealing face of the cylinder housing, which sealing face is inclined by at least 45° with respect to an orientation parallel to the longitudinal center axis (=axial direction) of the cylinder housing, and preferably lies at a right angle with respect to the longitudinal center axis of the cylinder housing. In the case of the movement of the piston in the direction of the advanced end position, said section of the piston seal or the further seal which is arranged on the piston lifts up from said sealing face. As a result, an additional sealing action for compressed air which is introduced into the cylinder space in the withdrawn end position of the piston can be achieved, as a result of which the compressed air consumption can be reduced.

A piston-cylinder unit according to the invention can be used in conjunction with different apparatuses to be driven. One advantageous application is represented, in particular, by a vacuum valve with a piston-cylinder unit of this type which forms the drive of the vacuum valve or at least one part of the drive of the vacuum valve, in order to adjust the closure member of the vacuum valve between an open position which releases the valve opening and a closed position which closes the valve opening.

BRIEF DESCRIPTION OF THE DRAWINGS

Further advantages and details of the invention will be described in the following text on the basis of the appended drawing, in which:

FIGS. 1 and 2 show perspective views of one exemplary embodiment of a piston-cylinder unit according to the invention from different viewing directions, FIG. 3 shows a side view, FIG. 4 shows a section along the line AA from FIG. 3 (advanced end position of the piston), FIG. 5 shows a section in accordance with FIG. 4 in the withdrawn end position of the piston, FIG. 6 shows a perspective view of a vacuum valve with a piston-cylinder unit of this type, FIG. 7 shows a side view, FIG. 8 shows a section along the line BB from FIG. 7 (closed position of the closure member), FIG. 9 shows a section in an analogous manner to FIG. 8 in the open position of the closure member, FIG. 10 shows a section in a diagonal direction (through two fastening screws which lie opposite one another), and FIG. 11 shows a part of a section through a piston-cylinder unit in accordance with one modified embodiment of the invention.

DETAILED DESCRIPTION

One exemplary embodiment of a piston-cylinder unit according to the invention which is driven by way of compressed air is shown in FIGS. 1-5. The piston-cylinder unit has a cylinder housing 1 with a cylinder interior space 2. A piston 3 is arranged in the cylinder interior space 2. A piston rod 4 emanates from the piston 3, which piston rod 4 is guided through an opening out of the cylinder housing 1.

The cylinder housing 1 has a longitudinal center axis 8. The longitudinal center axis 8 of the cylinder housing 1 and the longitudinal center axis of the piston rod 4 lie on a common straight line (or, in other words, coincide).

The piston 3 consists of plastic, in particular of a thermoplastic. For example, the piston can consist of PA. A configuration made from POM is also possible. The plastic of the piston can be fiber reinforced.

A piston seal 5 which surrounds the piston in an annular manner is arranged on the piston 3, by which piston seal 5 the piston is sealed with respect to the cylinder housing 1. In the exemplary embodiment, the piston seal 5 is configured as a lip seal with a sealing lip 5a.

The piston seal 5 consists in a customary way of an elastomeric material, for example thermoplastic elastomer. For example, the piston seal can consist of TPU. In the exemplary embodiment, the piston seal 5 is molded onto the piston. For example, a groove might also be arranged in the piston 3, into which groove an O-ring is inserted.

The cylinder housing 1 has a pot-shaped base body 6 which consists of plastic, in particular of a thermoplastic. For example, the base body 6 can consist of PA. A configuration made from POM is also possible. The plastic of the base body 6 can be fiber reinforced.

The pot-shaped base body 6 is closed by a cover 9. The cover 9 has the opening, through which the piston rod 4 is guided out of the cylinder inner space 2. An annular seal 10 serves to seal the cover 9 with respect to the remaining cylinder housing 1. In the exemplary embodiment, this is an O-ring which is arranged in a groove of the cover 9 and bears against a sealing face which is formed by the sliding bush 7.

Fastening screws (not shown in FIGS. 1-5) can serve to fasten the cover 9 and press the seal 10. In particular, fastening of the piston-cylinder unit to an apparatus can also take place via said fastening screws, in the case of which apparatus the piston-cylinder unit is used as a drive, as will be described further below in conjunction with a vacuum valve.

The cover 9 can consist of the same plastic material as the base body 6.

Furthermore, the cylinder housing 1 comprises a sliding bush 7 which is arranged within the base body 6, bears against the base body 6, and radially delimits the cylinder interior space 2. The piston seal 5 bears against the sliding bush 7. The sliding bush 7 consists of plastic, for example PA or POM. The sliding bush 7 is provided with a solid lubricant, for example with glass beads.

The shell 1b of the cylinder housing 1 is therefore formed by way of the shell of the base body 6 and the sliding bush 7.

The inner surface of the sliding bush 7, which inner surface points towards the longitudinal center axis 8, therefore forms a sealing face for the piston seal 5, for a sealing lip 5a of the piston seal 5 in the exemplary embodiment. The sliding bush 7 is preferably molded onto the base body 6.

The piston 3 can be displaced in the cylinder interior space 2 between a withdrawn end position (FIG. 5) and an advanced end position (FIG. 4). In the exemplary embodiment, the displacement from the advanced end position into the withdrawn end position takes place by way of compressed air which is introduced by way of a port 13 into the pressure space which lies between the cover 9 and the piston 3. The displacement between the withdrawn end position and the advanced end position takes place by way of a spring which is integrated into the apparatus which is driven by the piston-cylinder unit, as will be described in conjunction with FIGS. 6-10. The space between the piston 3 and the bottom 1a is vented by way of a venting bore 14 in the bottom 1a.

An adjustment between the two end positions by way of compressed air might also be provided, or an adjustment between the withdrawn end position and the advanced end position by way of compressed air and in the opposite direction by way of a spring.

The sliding bush 7 has an end section 7a which projects in the direction of the central longitudinal center axis 8 and bears against the base body 6 in the region of the bottom 1a of the cylinder housing 1. Said end section 7a forms a sealing face 7b, against which a section 5b of the piston seal 5 bears in the withdrawn end position of the piston (FIG. 5). In the exemplary embodiment, said sealing face 7b for the section 5b of the piston seal 5 lies at a right angle with respect to the axial direction of the cylinder housing (=at a right angle with respect to the longitudinal center axis 8). In the case of other design variants, the sealing face might be inclined with respect to said orientation, said sealing face being inclined by at least 45° with respect to an orientation which is parallel to the longitudinal center axis 8.

If the piston is displaced starting from the withdrawn end position (FIG. 5) in the direction of the advanced end position (FIG. 4), the section 5b of the piston seal 5 lifts up from the sealing face 7b of the sliding bush.

A sliding sleeve 11 is arranged on the piston rod 4. This sliding sleeve 11 is connected to the piston rod 4 such that it cannot be displaced with respect to the piston rod 4, that is to say moves together with the piston rod 4. A piston rod seal 12 which surrounds the sliding sleeve 11 in an annular manner bears against the sliding sleeve 11, which piston rod seal 12 serves for sealing of the piston rod 4 with respect to the cylinder housing 1. The piston rod seal 12 therefore surrounds the opening, through which the piston rod 4 is guided out of the cylinder interior space 2. In the exemplary embodiment, the piston rod seal 12 is arranged on the cover 9, and is preferably molded onto it. Securing in a groove of the cover 9 is also conceivable and possible.

The piston rod seal 12 consists of an elastomeric material, for example thermoplastic elastomer. For example, the piston rod seal 12 can consist of TPU.

The piston rod seal 12 is preferably configured as a lip seal with a sealing lip 12a which bears against the outer surface of the sliding sleeve 11.

The piston rod seal 12 bears against the sliding sleeve 11 in the region of a seal section 11a of the sliding sleeve 11, via which seal section 11a it is displaced in the case of the adjustment of the piston between the advanced end position and the withdrawn end position of the piston 3. Furthermore, the sliding sleeve 11 has a guide section 11b which adjoins the seal section 11a in the axial direction of the piston rod 4. Displaceable guidance of the piston rod 4 with respect to the cylinder housing 1 takes place in the axial direction of the piston rod 4 via the guide section 11b. To this end, the cover 9 has a tubular stub-shaped section 9a which projects from the cover 9 in a direction which is directed away from the cylinder interior space 2, which tubular stub-shaped section 9a forms the opening, through which the piston rod 4 is guided out of the cylinder interior space 2. The tubular stub-shaped section 9a can consist of the same plastic material as the cover 9, and can be configured in one piece with the cover 9.

The inner face of the tubular stub-shaped section 9a forms a guide face which interacts with the outer surface of the sliding sleeve 11 in its guide section 11b, as a result of which a radial bearing for the sliding sleeve 11 is configured.

The outer diameter of the sliding sleeve is smaller in the region of the seal section 11a than in the region of the guide section 11b. As a result, a clear separation is achieved between the seal function and the guide function.

The sliding sleeve 11 consists of plastic, for example PA or POM. The plastic of the sliding sleeve 11 is provided with a solid lubricant, for example with glass beads.

The sliding sleeve 11 is preferably molded onto the piston rod 4. An application, for example, by way of pressing on or securing by way of adhesive bonding of the sliding sleeve 11 to the piston rod 4 is also conceivable and possible.

In a manner which is adjacent with respect to that end of the sliding sleeve 11 which is directed toward the cylinder interior space 2, a sealing material 15 is applied, for example molded, onto the outer surface of the piston rod 4. As shown, said sealing material 15 can continue as far as the surface of the piston. The sealing material 15 is intended to achieve additional security against passage of compressed air through a possible gap between the piston rod 4 and the sliding sleeve 11. The sliding sleeve 11 preferably bears without a gap against the piston rod 4, however.

A first section 4a of the piston rod 4, which first section 4a adjoins the piston 3, comprises a plastic material which is preferably configured in one piece (=in one piece from the same material) with the plastic material of the piston 3. A projection 4c of a second section 4b of the piston rod is embedded into said plastic material. The projection 4c and the second section 4b consist of metal and are preferably configured in one piece with one another. The second section 4b serves to connect the piston 3 to a part of the apparatus which is to be driven by the piston-cylinder unit. As a result, it can be configured as a connection which is stable in continuous operation.

One exemplary embodiment of a vacuum valve with a drive which is configured by the above-described piston-cylinder unit is shown in FIGS. 6-10. The vacuum valve has a valve housing 16 with a closure member 17 which is arranged in the valve housing 16. The closure member 17 can be adjusted between a closed position (FIG. 8), in which it closes a valve opening 18 in the valve housing 16, and an open position (FIG. 9), in which the valve opening 18 is released. In the exemplary embodiment, the vacuum valve is configured in the form of an angle valve, that is to say the valve housing 16 has a connector stub 16a which has the valve opening 18, and a connector stub 16b which has a further opening and is at a right angle with respect to said connector stub 16a.

The piston-cylinder unit which is shown in accordance with FIGS. 1-5 serves to adjust the closure member 17 between the closed position and the open position. To this end, the closure member 17 is fastened to the piston rod 4, for example by an external thread which is arranged on an end section of the piston rod 4 and is screwed into an internal thread of the closure member 17.

A diaphragm bellows 19 serves to additionally seal the entry of the piston rod 4 in the valve housing (the piston rod seal 12 alone is not sufficient to this end). One end of the diaphragm bellows is connected in a vacuum-tight manner to the closure member 17, for example by way of welding. An end piece 20 is attached, for example welded, at the other end of the diaphragm bellows 19. Said plate-shaped end piece 20 closes the insertion opening 21 in the valve housing 16. A sealing ring 22 is arranged for vacuum-tight connection between the end piece 20 and the valve housing. The pressing of the sealing ring 22 between the end piece 20 and the valve housing 16 takes place by screws 23. The latter also penetrate bores in the cylinder housing 1 and in the cover 9, and are screwed into threaded bores in the valve housing 16. Therefore, the piston-cylinder unit is also connected to the valve housing 16 by way of the screws 23, the cover 9 being held together with the cylinder housing 1 while pressing the seal 10.

If the closure member 17 is to be removed from the valve housing 16 for service purposes, the screws 23 can be unscrewed.

Furthermore, a supporting part 25 is held on the piston rod 4 by a clamping ring 24. A helical spring 26 is arranged between the supporting part 25 and a step of the tubular stub-shaped section 9a. When the space which lies between the piston 3 and the cover 9 is vented, the closure member 17 is pressed onto the sealing face 28 which surrounds the valve opening 18 by the helical spring 26 with pressing of the sealing ring 27 which is arranged on the closure member 17, and the vacuum valve is closed (=sealed position of the vacuum member 17).

By way of pressurization of the space between the piston 3 and the cover 9, the closure member 17 is lifted up from the sealing face 28 and is moved into its open position.

FIG. 11 shows a somewhat modified embodiment of a piston-cylinder unit according to the invention. The difference from the above-described exemplary embodiment consists, in particular, in that an additional seal 29 is arranged on the piston 3, which additional seal 29 bears against a sealing face 30 of the cylinder housing 1 in the withdrawn end position of the piston 3. As a result, an additional sealing action with respect to an escape of compressed air through the venting bore 14 is configured in the withdrawn end position of the piston.

Different further modifications of the described exemplary embodiments of the invention are conceivable and possible without departing from the scope of the invention.

A vacuum valve which is driven by a piston-cylinder unit according to the invention can also be configured in another way than in the form of an angle valve. For example, the adjustment of the closure member between the open position and the closed position might also take place in the manner of an L port valve, it being possible for the two movement components of the closure member to be brought about by way of a single piston-cylinder unit (as known by way of corresponding guide elements), or it also being possible for there to be two separate piston-cylinder units for the two movement components, which two separate piston-cylinder units would preferably both be configured in the way according to the invention.

LIST OF DESIGNATIONS

1 Cylinder housing
1a Bottom
1b Shell
2 Cylinder interior space
3 Piston
4 Piston rod
4a First section
4b Second section
4c Projection
5 Piston seal
5a Sealing lip
5b Section
6 Base body
7 Sliding bush
7a End section
7b Sealing face
8 Longitudinal center axis
9 Cover
9a Tubular stub-shaped section
10 Seal
11 Sliding sleeve
11a Sealing section
11b Guide section
12 Piston rod seal
12a Sealing lip
13 Port
14 Venting bore
15 Sealing material
16 Valve housing
16a Connector stub
16b Connector stub
17 Closure member
18 Valve opening
19 Diaphragm bellows
20 End piece
21 Insertion opening
22 Sealing ring
23 Screw
24 Clamping ring
25 Supporting part
26 Helical spring
27 Sealing ring
28 Sealing face
29 Seal
30 Sealing face

The invention claimed is:

1. A piston-cylinder unit, comprising:
a cylinder housing which has a cylinder interior space,
a piston arranged in the cylinder interior space,
a piston rod extending from the piston, the piston rod is guided through an opening out of the cylinder housing,
a piston rod seal arranged on the cylinder housing that seals the piston rod to the cylinder housing,
a sliding sleeve made from plastic that is moved together with the piston rod, and against which the piston rod seal bears arranged on the piston rod,
wherein the cylinder housing includes a base body and a sliding bush which is made from plastic is arranged within the base body, and a piston seal arranged on the piston bears against the sliding bush for sealing between the piston and the cylinder housing,
wherein in a withdrawn end position of the piston, a section of the piston seal or a further seal which is arranged on the piston bears against a sealing face of the cylinder housing and, upon movement of the piston in a direction of an advanced end position, is configured to lift up from said sealing face, said sealing face being inclined by at least 45° with respect to an orientation parallel to a longitudinal center axis of the cylinder housing, and
the sealing face is formed by an end section of the sliding bush, said end section projects in the direction of the central longitudinal center axis of the cylinder housing.

2. The piston-cylinder unit as claimed in claim 1, wherein the sliding sleeve includes a seal section in a region of the piston rod seal which bears against the sliding sleeve, and a guide section in a region of a sliding guide configured between the sliding sleeve and the cylinder housing, the seal section and the guide section lying in different sections of a longitudinal extent of the sliding sleeve.

3. The piston-cylinder unit as claimed in claim 2, wherein an external diameter of the sliding sleeve is smaller in the region of the seal section than in the region of the guide section.

4. The piston-cylinder unit as claimed in claim 1, wherein the cylinder housing has a tubular stub-shaped section which projects on an outside and forms the opening, through which the piston rod is guided out of the cylinder interior space, and said tubular stub-shaped section forms a radial bearing for the sliding sleeve, the cylinder housing and the tubular stub-shaped section comprising a plastic material, and at least one part of the cylinder housing and the tubular stub-shaped section are made from a same material.

5. The piston-cylinder unit as claimed in claim 1, wherein the piston and the piston rod comprise a plastic material and are configured in one piece with one another from the same plastic material.

6. The piston-cylinder unit as claimed in claim 5, wherein the piston rod comprises a first section which comprises the plastic material which is configured in one piece with the plastic material of the piston from the same material, and a second section which consists of metal and from which a projection extends which consists of metal and is embedded into the plastic material of the first section.

7. A piston-cylinder unit, comprising:
a cylinder housing which has a cylinder interior space,
a piston arranged in the cylinder interior space,
a piston rod extending from the piston, the piston rod is guided through an opening out of the cylinder housing,
a piston rod seal arranged on the cylinder housing that seals the piston rod to the cylinder housing,
a sliding sleeve made from plastic that is moved together with the piston rod, and against which the piston rod seal bears arranged on the piston rod,
the piston and the piston rod comprise a plastic material and are configured in one piece with one another from the same plastic material, and
the piston rod comprises a first section which comprises the plastic material which is configured in one piece with the plastic material of the piston from the same material, and a second section which consists of metal and from which a projection extends which consists of metal and is embedded into the plastic material of the first section.

8. A piston-cylinder unit, comprising:
a cylinder housing which comprises a plastic material and has a cylinder interior space,
a tubular stub-shaped section which comprises a plastic material and projects on an outside from the cylinder housing and is made in one piece with a part of the cylinder housing,
a piston arranged in the cylinder interior space, a piston rod extending from the piston, the piston rod is guided through an opening out of the cylinder housing and through the tubular stub-shaped section, a piston rod seal arranged on the cylinder housing that seals the piston rod to the cylinder housing, a sliding sleeve made from plastic that is moved together with the piston rod, and against which the piston rod seal bears, is arranged on the piston rod, the sliding sleeve includes a seal section and a guide section, wherein the piston rod seal bears against the sliding sleeve in a region of the seal section and the tubular stub-shaped section forms a radial sliding bearing for the sliding sleeve in a region of the guide section, and an external diameter of the sliding sleeve is smaller in the region of the seal section than in the region of the guide section.

* * * * *